Feb. 28, 1956 T. R. BURNIGHT 2,736,772

PULSE MULTIPLEX COMMUNICATION SYSTEM

Original Filed Jan. 29, 1947 4 Sheets-Sheet 1

INVENTOR.
T. ROBERT BURNIGHT

BY

Howard White

ATTORNEY

Feb. 28, 1956 T. R. BURNIGHT 2,736,772

PULSE MULTIPLEX COMMUNICATION SYSTEM

Original Filed Jan. 29, 1947 4 Sheets-Sheet 2

INVENTOR.
T. ROBERT BURNIGHT

BY

Howard White
ATTORNEY

INVENTOR.
T. ROBERT BURNIGHT
BY
Howard White
ATTORNEY

INVENTOR.
T. ROBERT BURNIGHT
BY
Edward White
ATTORNEY 2,736,772
Patented Feb. 28, 1956

2,736,772

PULSE MULTIPLEX COMMUNICATION SYSTEM

Thomas Robert Burnight, Washington, D. C.

Original application January 29, 1947, Serial No. 724,935. Divided and this application September 23, 1948, Serial No. 50,723

2 Claims. (Cl. 179—15)

(Granted under Title 35, U. S. Code (1952), sec. 266)

This invention relates to multiplex signal transmission systems and in particular to multiplex electrical systems employing time position variation of pulse signals as a basis for intelligence transmission and is a division of application Serial No. 724,935, filed January 29, 1947.

In numerous applications of intelligence transmission systems it may be desired to transmit information relative to a plurality of variable quantities via a single communication link such as a wire or radio link. Numerous systems for this purpose have been available in the past, however, all known systems suffer from certain disadvantages such as limitation of speed with which information may be transmitted or undue apparatus complexity. In a typical prior art system, for example, multiple pulse type signals are employed in which information is communicated by time variation between a synchronizing pulse and an information containing second pulse. For each variable quantity to be transmitted, an additional synchronizing pulse and an additional information containing second pulse are employed. Such a system is limited in response rate because in each cycle of operation a sufficient time interval must be allowed between successive synchronizing pulses to permit a selected maximum time displacement between a first synchronizing pulse and the information containing second pulse. A further disadvantage of such prior systems is power requirement because twice as many pulse signals must be transmitted as there are intelligence channels.

It is therefore an object of the present invention to provide a pulse type signal transmission system for conveying intelligence relative to a plurality of variable quantities in which only a single synchronizing pulse signal is required for all the channels regardless of the number of intelligence conveying channels employed.

Another object of the present invention is to provide a method of conveying via a single transmission link intelligence relative to a plurality of quantities any of which may be subject to rapid variation.

Another object of the present invention is to provide a modulator device for generating intelligence containing multiple pulse signal groups in which the intelligence is contained as variations in the time spacing between adjacent pulse signals of the group.

Another object of the present invention is to provide a pulse generator for producing repetitive multiple pulse signal groups in which the time spacing between successive pulses in the groups is varied in accordance with control signals.

Another object of the present invention is to provide a modulator device for generating intelligence-containing multiple pulse signal groups having a first synchronizing pulse signal and a plurality of succeedent intelligence conveying pulse signals bearing time spacings in dependency on the intelligence to be transmitted.

Another object of the present invention is to provide a demodulator device for operation in conjunction with the above modulator capable of separating into individual channels the information contained on the multiple pulse signal groups produced thereby.

Other and further objects and features of the present invention will become apparent upon a careful consideration of the accompanying drawings and detailed descriptions.

In accordance with the general concepts of the present invention, a multiplex communication system is provided in which repetitive multiple pulse signal groups selected as the basis for transmission are varied in accordance with the various intelligence quantities which are to be transmitted. The variation of the pulse signal groups is of a specific nature with intelligence transmission based upon the time spacing between successive pulses in the individual signal groups. In practice the time spacing between each successive two pulses of the group is allotted to transmission of one quantity of those desired. Thus the variation in time spacing between these selected successive pulses of the recurrent groups will always represent a variation in the selected quantity while a variation in another time spacing between different successive pulses will represent a variation in a second selected quantity. In this manner it is possible to make each pulse signal do double duty. Not only is each pulse signal capable of marking the termination of a time period allotted to a first quantity but also it is capable of marking the beginning of a time period allotted to a second quantity. The generation of such an intelligence containing multiple pulse wavetrain requires specific apparatus which is also provided by the present invention.

Specific apparatus suitable for such signal generation employs a plurality of electronic trigger circuits, connected tandemly for operation in sequence, one from another, with adjustable individual time delays.

Figure 1:
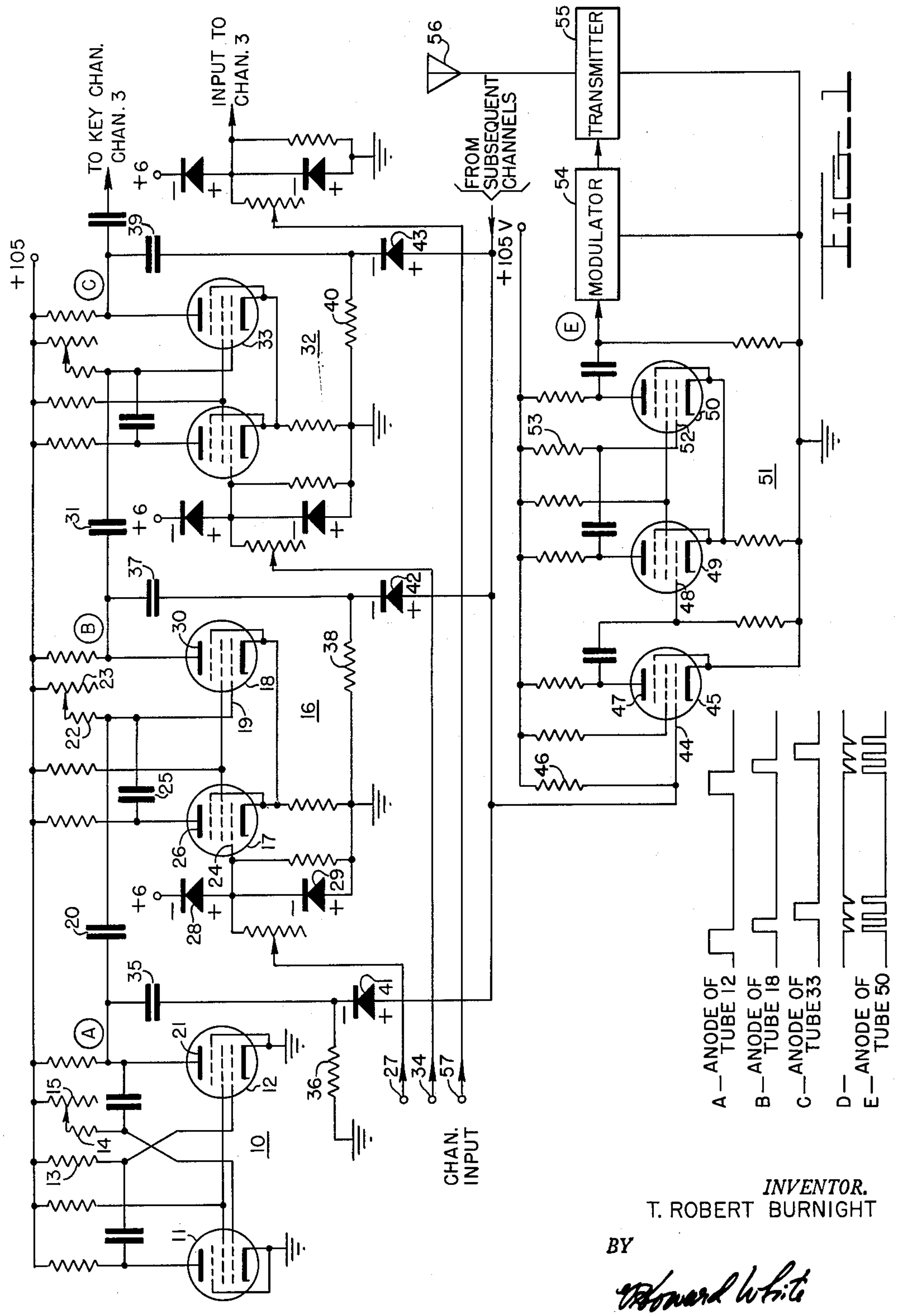
Fig. 1 is a schematic diagram, partly in block, of typical intelligence modulator system and power transmission devices embodying in part, the invention.

With particular reference now to Fig. 1 the equipment located at the transmitting end of the communication system is shown schematically. The apparatus of Fig. 1 is designed specifically for conveying two intelligence quantities, therefore three pulse signals providing two defined variable time intervals in each repetitive group are employed. A free running trigger circuit 10 comprising preferably the pentode type electron tubes 11 and 12 establishes the average recurrence rate of the multiple pulse signal group. Trigger circuit 10 is made free running in a conventional manner by virtue of the return of the control grids of tubes 11 and 12 to a positive supply potential through resistances 13, 14 and 15. Resistance 15 is made variable so that the time interval between recurrent pulse signal groups may be adjusted to a desired value.

A second trigger circuit 16 employing electron tubes 17 and 18 is allotted the task of determining the interval of time required in the transmission of a first intelligence quantity. To this end, the grid 19 of tube 18 is connected by means of capacitance 20 to the anode 21 of tube 12. In the quiescent condition of trigger circuit 16, tube 18 is held conductive by virtue of the return of grid 19 to a positive supply potential through resistances 22 and 23. The normally non-conductive condition of tube 17 is assured by virtue of the common cathode connections of tubes 17 and 18 and the return of the grid 24 of tube 17 to ground potential.

For the major portion of the time interval between recurrent pulse signal groups tube 12 of trigger circuit 10 is maintained in a conductive condition. Immediately preceding the generation of a recurrent pulse signal group tube 11 reaches a conductive condition resulting in anode current cutoff of tube 12 to initiate the positive pulse signals as shown by waveform A in Fig. 1. Differentiation of the positive pulses by the short time constant circuit including the capacitance 20 produces a series of alternate positive and negative pulses which are supplied to the grid 19 of tube 18. In the normally conductive condition of tube 18 the positive pulses have no effect, however, the negative pulses cause anode current cutoff of tube 18 so that trigger operation of circuit 16 is produced. Tube 17 is thus brought into conduction and remains in that state until coupling capacitance 25 undergoes a sufficient change in potential thereacross to permit tube 18 to return to conduction. The time interval required for this voltage change is determined primarily by the time constant of the circuit of capacitance 25 and resistances 22 and 23. By means of the variable resistance 23 the time constant of the charge path may be adjusted so that this charge time is lengthened or shortened. The amplitude of the initial voltage change at the anode of tube 17 also affects the duration of the conductive condition of tube 17. When tube 17 is brought from the non-conductive condition to a heavily conductive condition the large amplitude of the signal at anode 26 will drive grid 19 far negative to lengthen the duration of the charge time required to return tube 18 to conduction. Conversely if tube 17 is brought from non-conductive condition to a lightly conductive condition a small amplitude excursion of anode 26 will permit grid 19 to rise to initiate conduction of tube 18 after a short interval of time. The degree of conductivity of tube 17 is readily adjusted by variations of the potential at grid 24 in accordance with a first input signal applied to terminal 27. This input signal may be of a varying or alternating current type provided the variation is small in the time interval between successive periods of operation of trigger circuit 16. To insure stable operation of circuit 16, a pair of unilateral limiting elements 28, 29 are placed in the grid circuit of tube 17 to prevent the potential of grid 24 from rising above a selected maximum, typically 6 volts, or from falling below ground potential. These elements are inserted as a precautionary measure alone and in many cases may not be required.

The output pulses of varying duration as obtained from the anode circuit of tube 18 are supplied through the coupling capacitance 31 to a subsequent trigger circuit 32 which may be similar in all respects to trigger circuit 16. In the quiescent condition of trigger circuit 32 tube 33 is conductive. This condition is altered upon reception of a differentiated negative pulse produced upon resumption of conduction by tube 18. Thus trigger circuit 32 is brought to the unstable condition and remains there for a period of time which may be adjusted by the input signal applied to terminal 34.

The pulse signals produced at the anode 5 of tubes 12, 18 and 33 are supplied through short time constant coupling circuits 35 and 36, 37, 38, and 39, 40, and the unilateral impedance elements 41, 42, 43 to the control grid 44 of a normally conductive electron tube 45. Tube 45 is maintained in a state of heavy conduction by the return of its control grid 44 to a positive supply potential through resistance 46. The unilateral impedance elements 41, 42, 43 are polarized to permit the application to grid 44 of only the negative-going edges of the differentiated anode pulses. Upon reception of these negative-going edges the conductive condition of tube 45 is interrupted so that a series of sharp positive impulses is produced at the anode 47 thereof. The voltage excursions of the anode 47 are coupled to the grid 48 of an electron tube 49 which together with a second electron tube 50 forms another trigger circuit 51. Trigger circuit 51 is maintained with tube 50 normally conducting by the return of the grid 52 to a positive supply potential through resistance 53. The application of each positive pulse to grid 48 produces a reversal of the quiescent condition in circuit 51 resulting in conduction for a short period of time by tube 49. From the anode of tube 50 is thus obtained a series of positive pulses of uniform duration but variable time spacing. These positive pulses are employed to key a modulator device 54 to permit controlled operation of transmitter 55. Radio frequency energy generated by transmitter 55 is radiated by an antenna 56.

As thus described the circuit of Fig. 1 is capable of transmitting intelligence relative to two independently variable quantities requiring a series of only three pulses of energy. Where it is desired to transmit information relative to additional variable quantities, additional trigger circuits similar to circuit 16 may be connected in tandem and operated by additional input channels. For example, the output signals from the anode of tube 33 may be applied to the appropriate control grid of a subsequent trigger circuit assigned to the generation of intelligence conveying pulses for a third variable quantity applied to input terminal 57. Intelligence conveying pulse signals produced thereby are supplied through suitable integrating and selector circuits to the grid of tube 45.

Figure 2:
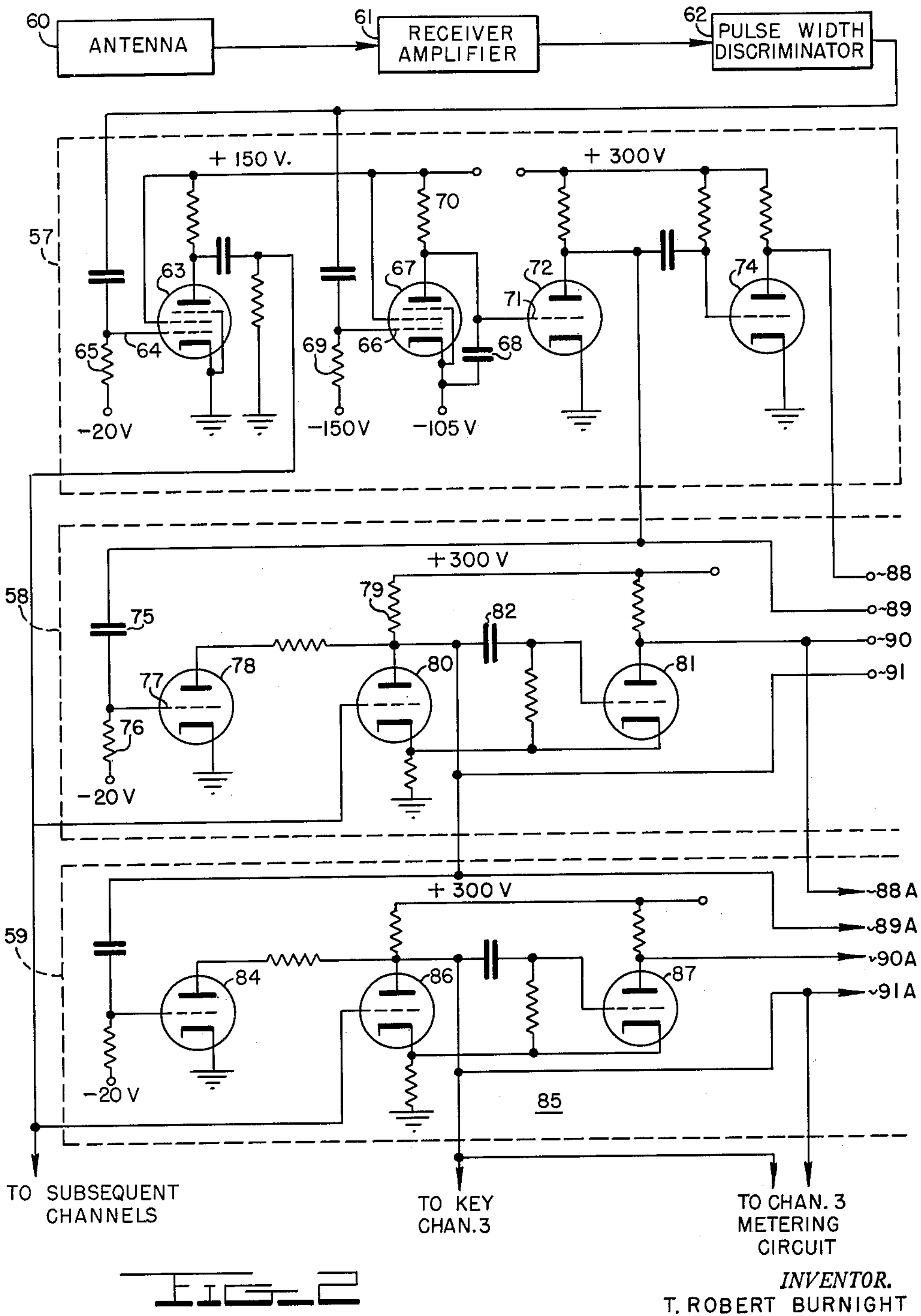
Fig. 2 is a schematic diagram, also partly in block, of typical component parts forming, together, the receiving end of the intelligence transmission system.
Figure 3:
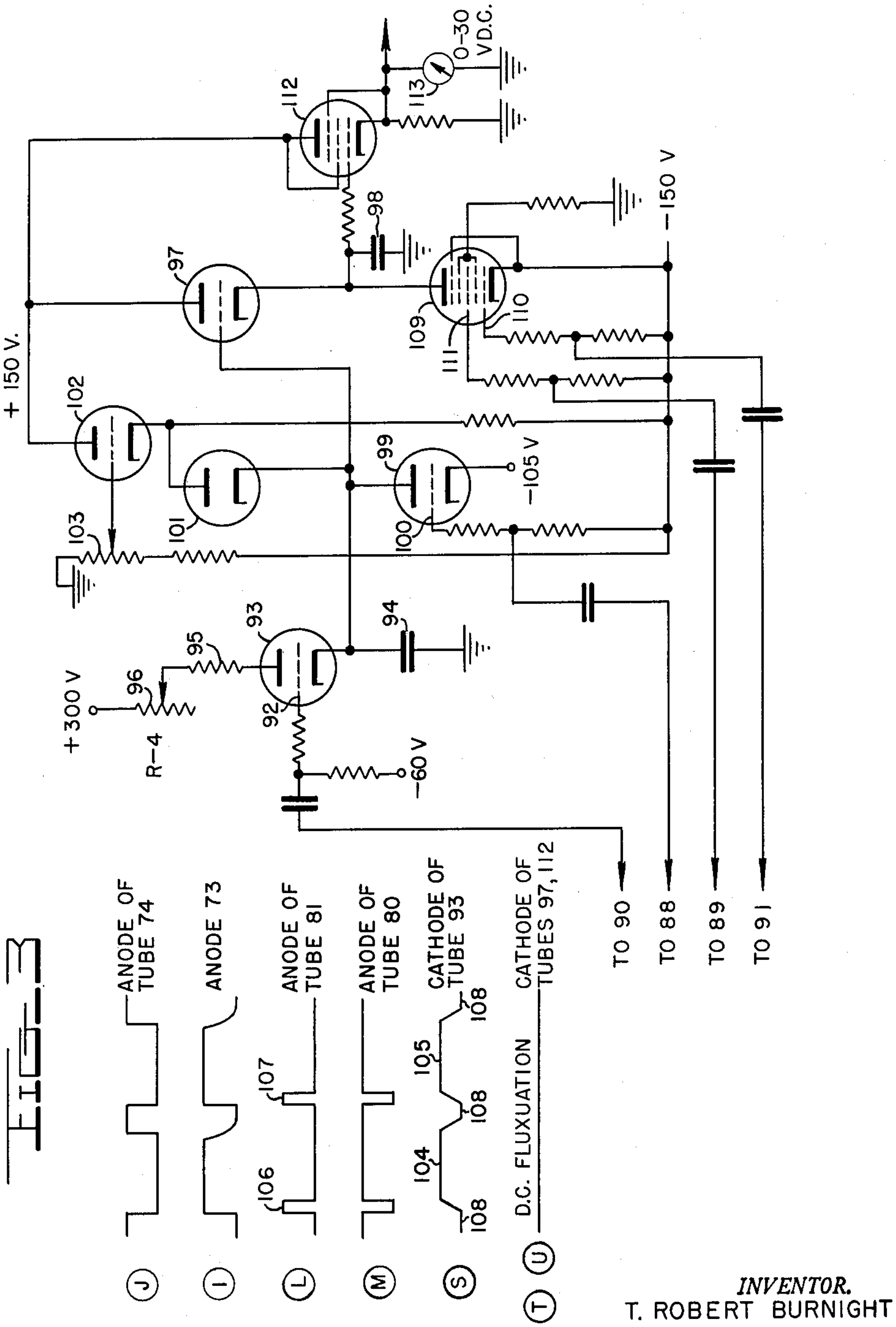
Fig. 3 shows additional typical receiving system components employed to integrate individually, the output of each of the channels of Fig. 2, together with signal waveforms applicable thereto.

With reference now to Figs. 2 and 3 apparatus is shown for extracting and delivering into individual channels the intelligence placed upon the multiple pulse wavetrain from the apparatus of Fig. 1. As in the transmitter circuit of Fig. 1, an overall control circuit indicated in general in block 57 is employed to control the operation of individual circuits indicated in blocks 58 and 59. To the master circuit 57 is supplied the modulation envelope of the signals received by antenna 60 after suitable amplification and demodulation within the receiver and amplifier 61. To reduce the susceptibility of the system to pulses of other than the desired width, the pulse width discriminator 62 is placed in the signal path between receiver amplifier 61 and the control circuit 57. By means of discriminator 62 only those pulses having selected width characteristics corresponding to those of the pulses emitted by transmitter 55 are delivered to control circuit 57. Included in control circuit 57 is a pulse amplifier stage employing amplifier tube 63. Amplifier 63 is biased so that it is normally maintained in a non-conductive condition by the return of control grid 64 to a negative supply through resistance 65. Thus positive signals (as shown by waveform (F), Fig. 4) supplied to the grid 64 of tube 63 produce a second series of signals amplified negative (shown in waveform (G)) for application in parallel to the circuits 58 and 59. The positive pulses supplied to grid 64 of tube 63 are also supplied to a control grid 66 of a sawtooth generator tube 67. Connected between the anode and cathode electrodes of tube 67 is a sawtooth generator capacitance 68. Tube 67 is normally maintained in a non-conducting condition by the return of grid 66 to a negative supply potential through resistance 69. Upon receipt of each of the positive pulses, however, tube 67 becomes conductive, partially discharging capacitance 68. Subsequent to each positive pulse capacitance 68 recharges towards the positive supply potential through the anode load resistance 70. This action is shown by waveform (H) of Fig. 4.

The anode of tube 67 is directly coupled to the grid 71 of the electron tube 72. Tube 72 is maintained in a non-conductive condition for a period of time following each positive pulse applied to grid 66, however, after a selected interval of time following the termination of a positive pulse signal applied to tube 67 the charging of capacitance 68 permits tube 72 to become conductive to produce at the anode 73 thereof a clipped signal of the type shown by waveform (I) of Fig. 4. Responsive to this signal is a normally conductive electron tube 74. Conduction by tube 74 is interrupted when tube 72 becomes conductive to produce a pulse type signal such as that shown in waveform (J) of Fig. 4.

The pulse type waveform produced at the anode 73 is also supplied via a short time constant circuit including capacitance 75 and resistance 76 to the grid 77 of a keying tube 78. Keying tube 78 is normally maintained in a non-conductive condition, however, upon receipt of the differentiated positive signal (waveform (K)), produced coincidentally with the initiation of conduction in tube 72 by the first pulse of a recurrent pulse signal group, tube 78 becomes conductive.

Anode current in tube 78 is supplied through a load resistance 79. Resistance 79 is also the anode load resistance for an electron tube 80 which, together with tube 81 comprises a trigger circuit in which tube 81 is normally conducting. The drop in potential produced across resistance 79 as a result of the initiation of conduction within tube 78 produces a drop in potential at the grid of tube 81 so that trigger circuit action is initiated. Tube 81 is brought into non-conduction and remains for a period of time as normally determined by the time constant circuit including capacitance 82 and resistance 83. However, this time constant is made relatively long so that a subsequent negative pulse applied to the grid of tube 80 from the anode of tube 63 will be effective in terminating the conductive condition within tube 80. This action results in the production of short duration positive pulses at the anode of tube 81 as represented in waveform (L) of Fig. 4.

Figure 4:
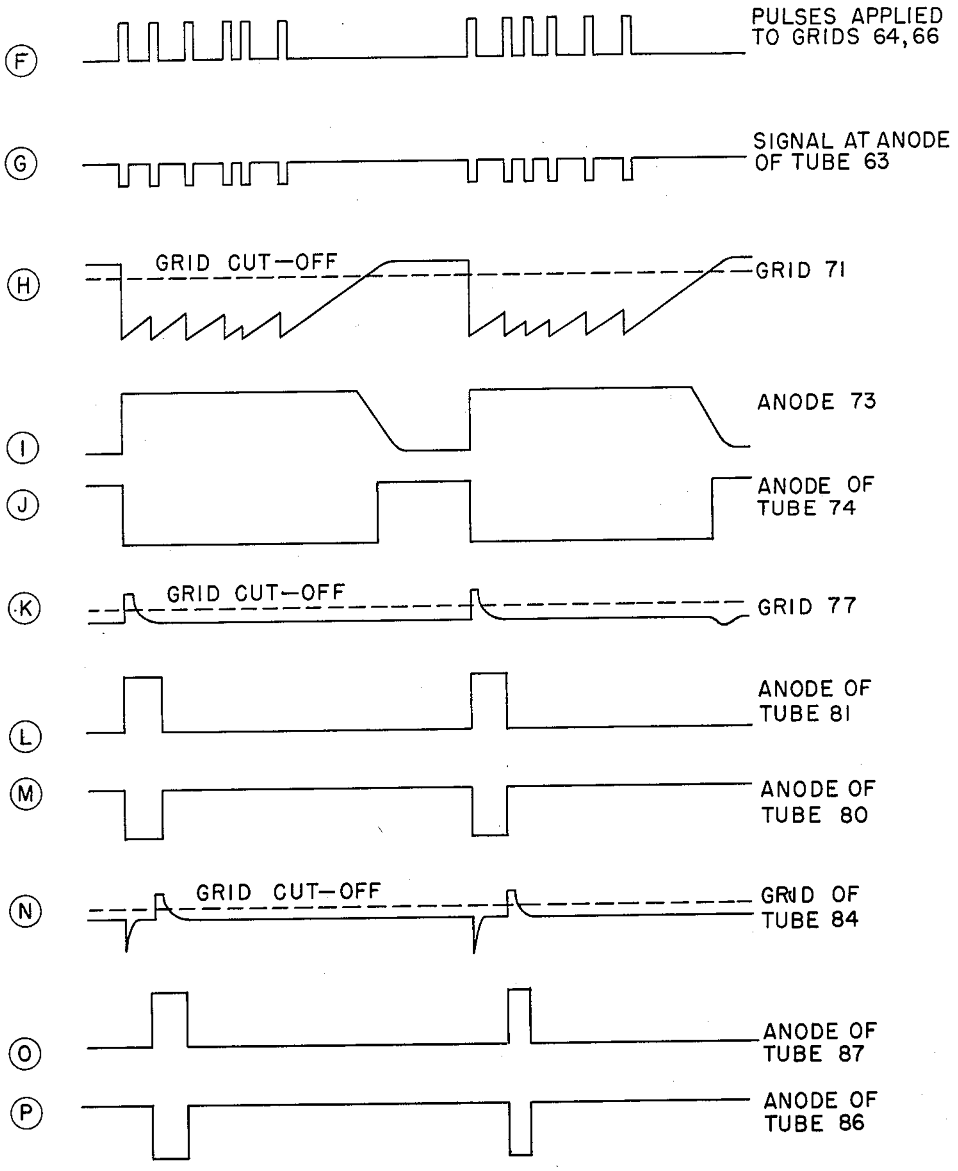
Fig. 4 shows a series of waveforms taken to illustrate more fully the operation of the receiver circuit of Fig. 2.

Simultaneously with the production of the positive pulses at the anode of tube 81, the reverse conductive conditions of tube 80 produce the negative impulses at the anode of tube 80 shown by waveform (M) of Fig 4.

The negative impulses from the anode of tube 80 are supplied to the grid of a second keying tube 84 which is constructed to provide operation similar to that of the circuit associated with tube 78. In a similar manner differentiation of the negative pulses from the anode of tube 80 produces the alternate negative and positive impulses of waveform (N). Tube 84 is brought to conduction in response to the positive impulses to initiate operation of the associated trigger circuit 85 comprising electron tubes 86 and 87. Operation of the trigger circuit 85 results in the production of the positive and negative pulses of waveforms (O) and (P), respectively, at the anodes of tubes 87 and 86. It is thus readily seen that the duration of the positive pulses of waveform (L) vary with the time spacing between the first and second pulses of the received multiple pulse waveform shown in (F) of Fig. 4. Similarly, the duration of the positive pulse at the anode of tube 87 is varied with the time interval between the second and third impulses of the multiple pulse input waveform.

Additional apparatus such as that shown in Fig. 3 is now required to transform variations in the time duration of the pulse signals of waveforms (L) and (O) into appropriate variations reproducing the signals applied to terminals 27 and 34, respectively, of Fig. 1. Components as shown in Fig. 3 are required for each of the output quantities. Four connections between the circuit of Fig. 2 and each of the devices according to Fig. 3 are required, connections being made to terminals as shown. For convenience certain of the waveforms of Fig. 4 are reproduced on Fig. 3. In operation a first positive pulse of waveform (L) supplied to the grid 92 of tube 93 permits a charging of capacitance 94 through the series path including the tube 93 and resistances 95 and 96. The resistance in the charging path of capacitance 94 prevents rapid charging thereof so that the final potential developed thereacross at the termination of each of the positive pulses of waveform (L) is nearly proportional to the duration of the pulses. Following this charging of capacitance 94 all discharge paths in shunt therewith are maintained non-conductive so that no appreciable discharge thereof will occur. The charging of capacitance 94 supplies a high potential to the grid of the cathode follower electron tube 97 permitting a charging of capacitance 98. Immediately preceding the receipt of subsequent positive pulses of waveform (L), capacitance 94 is discharged by means of the capacitance discharge tube 99 which is effectively in shunt therewith. Capacitance discharge tube 99 is operated by means of the positive pulses of waveform (J) which are applied to the grid 100 thereof. The discharge of capacitance 94 below a definite selected value is prevented by a unilateral impedance element 101 and another cathode follower type electron tube 102. By means of components 101 and 102 a minimum voltage level across capacitance 94 is established below which voltage minimum conduction by elements 101 and 102 occurs. This voltage level may conveniently be set by the potentiometer 103 whose purpose is to permit ready adjustment of the voltage of the grid of tube 102. A second positive pulse of waveform (L) is thus able to receive adequate time duration integration across capacitance 94. The resulting waveform as obtained across capacitance 94 is typified by waveform (S) of Fig. 3 in which the maximum positive levels 104 and 105 are determined by the duration of the positive pulses 106 and 107, respectively, of waveform (L) and the negative voltage levels 108 are determined by the voltage setting of the potentiometer 103.

In many instances it may be desirable to eliminate the portion of waveform (S) between the positive levels 104 and 105 since these excursions to and from the voltage level 108 do not truly represent signal voltage variations. The second integrator capacitance 98 together with its charge tube 97 and discharge tube 109 serve to prevent these undesired variations of waveform (S) from appearing in the output. Capacitance 98 is charged to the voltage levels 104 and 105 immediately following the respective position pulses 106 and 107 by means of cathode follower electron tube 97. Electron tube 109 is normally conductive, thus it presents a shunt resistive path across capacitance 98, current for which must continually be fed by the cathode follower 97. During the interval of time between the voltage levels 104 and 105 in waveform (S) in which it is impossible for tube 97 to supply current for tube 109, tube 109 is maintained in a non-conductive condition by either one or the other of its control grids 110 and 111. Control grid 110 receives the negative pulses of waveform (M), while grid 110 receives the negative pulses of waveform (I). Thus during the time interval in which capacitance 94 is discharged from level 104 to level 108 and again recharged to level 105 capacitance discharge tube 109 cannot conduct to lower the voltage across capacitance 98. On the other hand when a change in pulse duration sufficient to produce a voltage level 105 which is lower than the preceding voltage level 104 has taken place, electron tube 109 will discharge capacitance 98 during the time immediately following pulse 107 until the new voltage level 105 placed across capacitance 94 and at the grid of tube 97 is reached.

Cathode follower type electron tube 112 is interposed between capacitance 98 and the output circuit to prevent undesired loading and accompanying discharge of capacitance 98 by the output circuit operated therefrom. In this case a voltmeter 113 is shown as a suitable type of indicator where slow speed signal variations may be experienced. For higher speed signal variations an audio amplifier could be employed in place of the voltmeter 113.

For certain types of functions it may be possible to combine two signals into one channel of the transmitter so that both low speed and high speed variations will appear in the output circuit of tube 112. Such a case could require therefor both the voltmeter 113 and the audio amplifier in a typical case where the same integrating circuit is designed to handle both low speed and high speed variations.

From the foregoing discussion it is apparent that considerable modification of the features of the present invention is possible and while the devices here shown and the form of apparatus for the operation thereof constitute a preferred embodiment of the present invention it is to be understood that the invention is not limited to these precise devices and forms of apparatus and that considerable modification may be made therein without exceeding the scope of the invention which is defined in the appended claims.

The invention described herein may be manufactured and used by or for the Government of the United States of America for governmental purposes without the payment of any royalties thereon or therefor.

What is claimed is:

1. A pulse time multiplexing system comprising a chain oscillator, said oscillator being formed of a plurality of sequentially connected oscillating elements, the oscillations of each element being triggered by the oscillations of the next preceding element of said oscillator and persisting for a limited time, means generating a voltage pulse coincident with the termination of the oscillation of each of said elements, means varying the deviation of the oscillation of each of said elements in accordance with an audio voltage, and means summing and transmitting said pulses.

2. A pulse time multiplexing system comprising a chain oscillator, said oscillator being formed of a plurality of sequentially connected oscillating elements, the oscillation of each element being triggered by the oscillation of the next preceding element of said oscillator, means for limiting the duration of the oscillation of each of said elements, means generating a voltage pulse coincident with the termination of the oscillation of each of said elements, means varying the duration of the oscillation of each of said elements in accordance with a variable quantity, and means summing and transmitting said pulses.

References Cited in the file of this patent

UNITED STATES PATENTS

| | | |
|---|---|---|
| 1,848,839 | Ranger | Mar. 8, 1932 |
| 2,418,116 | Grieg | Apr. 1, 1947 |
| 2,419,292 | Shepard | Apr. 22, 1947 |